United States Patent [19]
Miyawaki et al.

[11] Patent Number: 5,752,266
[45] Date of Patent: May 12, 1998

[54] METHOD CONTROLLING MEMORY ACCESS OPERATIONS BY CHANGING RESPECTIVE PRIORITIES THEREOF, BASED ON A SITUATION OF THE MEMORY, AND A SYSTEM AND AN INTEGRATED CIRCUIT IMPLEMENTING THE METHOD

[75] Inventors: Katsuki Miyawaki; Yukio Otobe; Kimihiko Kazui; Hideki Miyasaka, all of Kawasaki; Yasunori Ueno, Yokohama; Kouji Maruyama, Fukuoka, all of Japan

[73] Assignee: Fujitsu Limited, Kawasaki, Japan

[21] Appl. No.: 571,493

[22] Filed: Dec. 13, 1995

[30] Foreign Application Priority Data

Mar. 13, 1995 [JP] Japan ................................ 7-052610

[51] Int. Cl.$^6$ .................................................. G06F 7/00
[52] U.S. Cl. .................................... 711/158; 711/151
[58] Field of Search .............................. 395/485, 478, 395/864; 711/158, 151

[56] References Cited

U.S. PATENT DOCUMENTS

| | | | |
|---|---|---|---|
| 3,916,388 | 10/1975 | Shimp et al. | 395/800 |
| 4,547,800 | 10/1985 | Masaki | 348/95 |
| 4,963,866 | 10/1990 | Duncan | 341/110 |
| 5,265,258 | 11/1993 | Fiene et al. | 395/485 |
| 5,548,696 | 8/1996 | Kubota et al. | 395/135 |
| 5,566,306 | 10/1996 | Ishida | 395/309 |
| 5,603,061 | 2/1997 | Hilley et al. | 395/864 |

OTHER PUBLICATIONS

Microsoft Press, "Computer Dictionary: The Comprehensive Standard for Business, School, Library, and Home", ISBN 1-55615-597-2, pp. 138 & 413, 1994.

*Primary Examiner*—Tod R. Swann
*Assistant Examiner*—Felix B. Lee
*Attorney, Agent, or Firm*—Staas & Halsey

[57] ABSTRACT

Control operations to access a memory changes respective priorities of the operations depending on the situation of the memory, and the operations are arbitrated and scheduled according to the respective, changed priorities, in order to avoid concentration on or rejection of a specific memory access operations and to eliminate an ineffective period. This realizes an efficient memory system without increasing the capacity of a buffer memory, the width of a memory bus, or an operating frequency.

35 Claims, 13 Drawing Sheets

PRIORITY  B  >  E  >  D  >  A  >  R  >  C

LOGICAL
FORMULA
$$\begin{aligned}
b &= B \\
e &= \hat{\ } B \ \& \ E \\
d &= \hat{\ } B \ \& \ \hat{\ } E \ \& \ D \\
a &= \hat{\ } B \ \& \ \hat{\ } E \ \& \ \hat{\ } D \ \& \ A \\
r &= \hat{\ } B \ \& \ \hat{\ } E \ \& \ \hat{\ } D \ \& \ \hat{\ } A \ \& \ R \\
c &= \hat{\ } B \ \& \ \hat{\ } E \ \& \ \hat{\ } D \ \& \ \hat{\ } A \ \& \ \hat{\ } R \ \& \ C
\end{aligned}$$

$\hat{\ }$ : NOT
& : AND

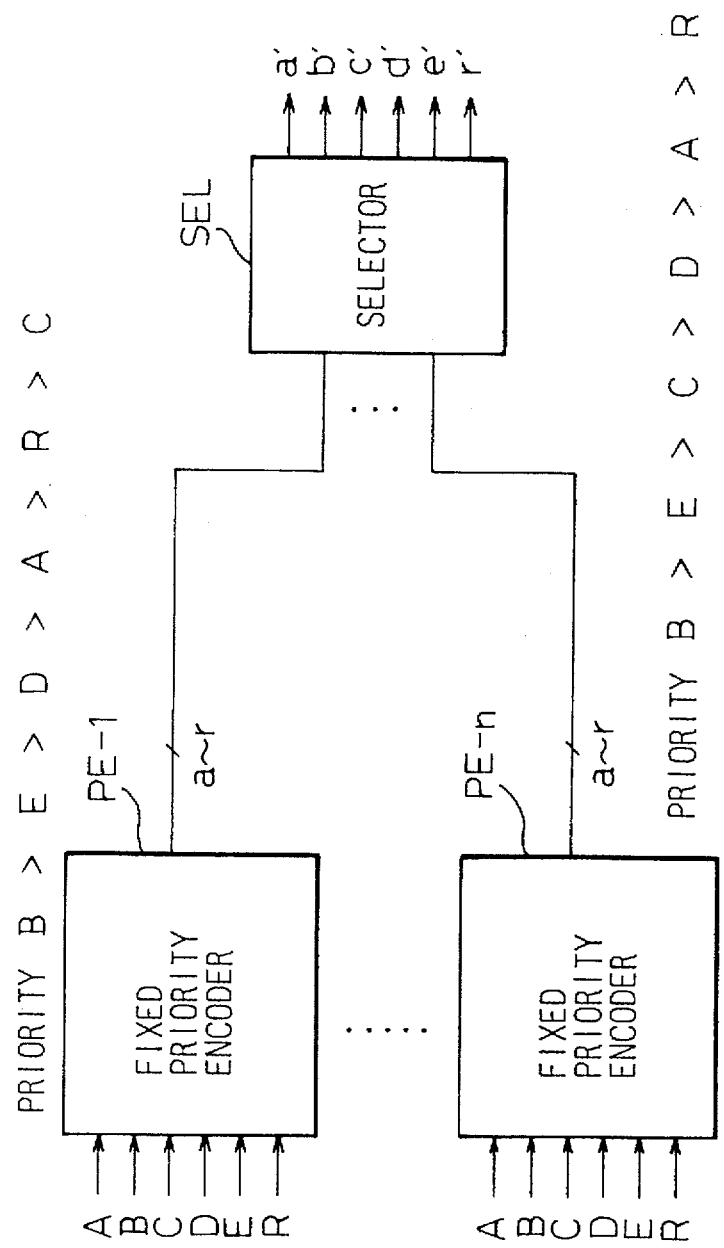

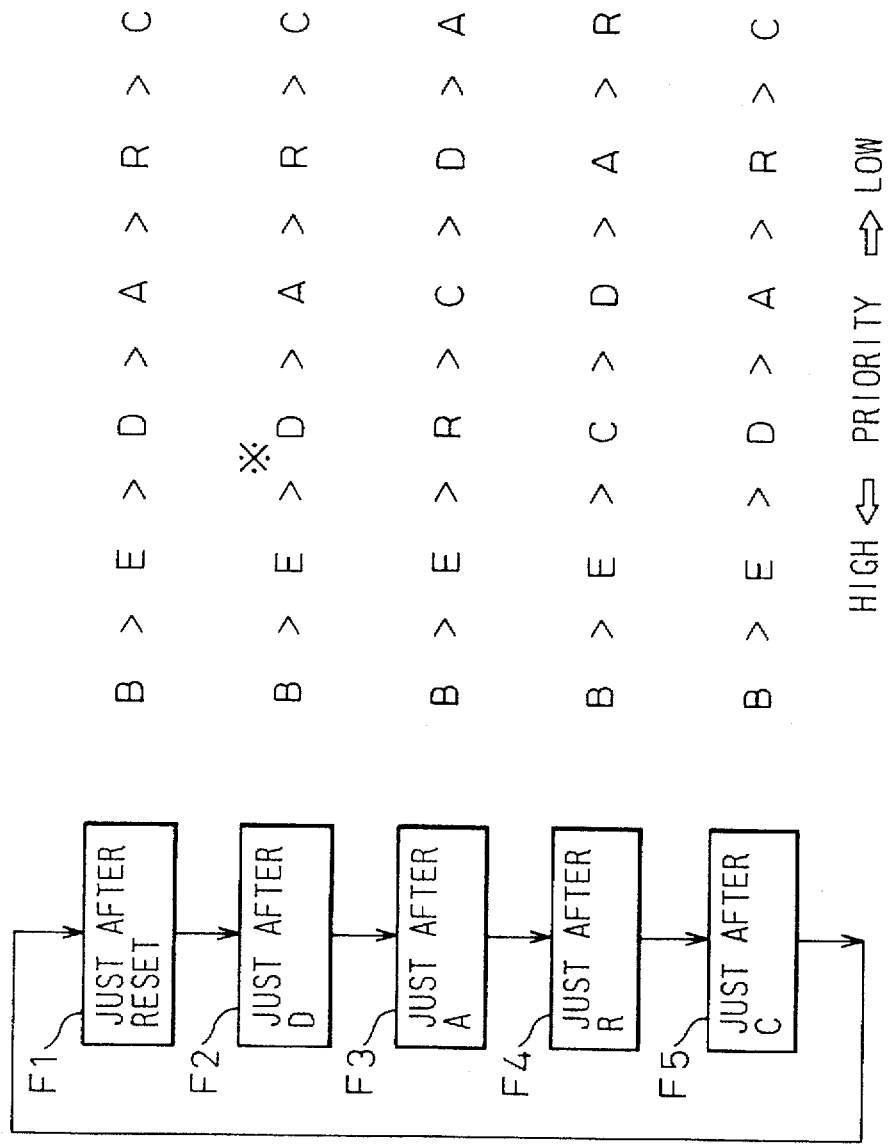

1

METHOD CONTROLLING MEMORY ACCESS OPERATIONS BY CHANGING RESPECTIVE PRIORITIES THEREOF, BASED ON A SITUATION OF THE MEMORY, AND A SYSTEM AND AN INTEGRATED CIRCUIT IMPLEMENTING THE METHOD

BACKGROUND OF THE INVENTION

1. Field of the Invention

The present invention relates to a method of controlling access to a memory, to an LSI (large scale integrated circuit) and to an image decoding apparatus employing the method. In particular, the present invention relates to an LSI and an image decoding apparatus for decoding a coded image into a decoded image and displaying the image.

2. Description of the Related Art

Recently, multimedia devices, which handle and process audio signals, video signals and characters as digital signals, have been studied and developed. Further, techniques for compressing and expanding (or coding and decoding) a color moving image has become important for multimedia devices, since the amount of the video signal data (image data) is much larger than that of the audio signal data or character data.

In the prior art, an image decoding apparatus has separate memories for storing a coded (compressed) image and for storing a decoded (expanded) image.

Further, an image decoding apparatus according to another prior art connects high-speed memories in parallel with one another to secure a wide memory bandwidth, i.e., a large data transfer capacity and time-shares the memories with coded and decoded images (coded data and decoded image data). In addition, an image decoding apparatus according to still another prior art arranges a buffer memory of large capacity between a memory and an image decoding LSI.

Each of these apparatuses requires a large amount of memory (i.e., large memories) and a high operating frequency (high speed clock), which complicates the structure of the apparatus.

Although the volume of a coded image is small on the average, there is sometimes a coded image involving a large number of codes.

Accordingly, the memory for storing the coded image must have a wide memory bandwidth suitable for the maximum number of codes. To improve the resolution of a decoded image and the quality thereof, coded and decoded images must be provided with a wide memory bandwidth. This, however, increases the size of the decoding apparatus.

The prior arts must have high-performance large-capacity memories to store and control coded and decoded images. To solve these problems of the prior arts, it is necessary to provide an LSI or an image decoding apparatus capable of storing coded and decoded images in a single memory of reasonable capacity.

SUMMARY OF THE INVENTION

An object of the present invention is to improve the efficiency of a memory system without increasing the capacity of a buffer memory, the width of a memory bus, or the operating frequency.

According to the present invention, there is provided a method of controlling memory access operations to access a memory, comprising the steps of changing the priority of the memory access operations depending on the situation in the memory, and arbitrating and scheduling the operations according to the changed priority, thereby avoiding concentration on or rejection of a specific memory access operation and eliminating an ineffective period.

The memory may be a volatile semiconductor memory requiring a refresh operation and may be time-shared by different types of data, and the method may arbitrate and schedule the memory access operations of writing and reading the different types of data to and from the volatile semiconductor memory and a memory access operation for refreshing the volatile semiconductor memory. The volatile semiconductor memory may be a dynamic random access memory and the different types of data may be coded data of a compressed image and decoded image data of an expanded image, wherein the memory access operations of the dynamic random access memory may comprise a coded image write operation for writing the coded data in the dynamic random access memory, a coded image read operation for reading the coded data out of the dynamic random access memory, a decoded image write operation for decoding the coded data and writing the decoded image data in the dynamic random access memory, a reference image read operation for referring to image data of a preceding field or frame as a reference image when decoding the coded data, a display image read operation for reading the decoded image data out of the dynamic random access memory and displaying the decoded image data, and a refresh operation for refreshing the dynamic random access memory. Non-urgent memory access operations, such as the coded image write operation and the refresh operation, may be carried out during a period between the decoded image write operation and the reference image read operation.

The priority of the coded image read operation may be set at the highest priority in order to realize a high speed reading operation. The priority of the coded image read operation may be set higher than that of the decoded image write operation and the reference image read operation.

The priority of the memory access operations may be determined just (i.e., immediately) after the reset operation, just after the reference image read operation, and just after the decoded image write operation, with the priority of the coded image read operation>the priority of the display image read operation>the priority of the reference image read operation>the priority of the coded image write operation>the priority of the refresh operation>the priority of the decoded image write operation.

The priority of the memory access operations may be determined just (i.e., immediately) after the coded image write operation, with the priority of the coded image read operation>the priority of the display image read operation>the priority of the refresh operation>the priority of the decoded image write operation>the priority of the reference image read operation>the priority of the coded image write operation.

The priority of the memory access operations is determined as follows immediately after the refresh operation, with the priority of the coded image read operation>the priority of the display image read operation>the priority of the decoded image write operation>the priority of the reference image read operation>the priority of the coded image write operation>the priority of the refresh operation.

The memory access operations may be carried out by using a variable-length control method for accessing a required quantity of the coded data or the decoded image data in the memory. The priority of the memory access operation may be determined in accordance with a preceding memory access operation.

Further, according to the present invention, there is provided an image decoding apparatus for decoding a compressed and coded data comprising a data processing circuit for processing a first type of data and providing a second type of data; a memory for storing the first and second types of data in a time sharing manner; and a memory control circuit for changing a priority of memory access operations of writing and reading the first and second types of data to and from the memory depending on a situation of the memory, and arbitrating and scheduling the memory access operations according to the changed priority, whereby avoiding concentration on or rejection of a specific memory access operation and eliminating an ineffective period.

The memory may be a dynamic random access memory, the first type of data may be coded data of a compressed image, the second type of data may be decoded image data of an expanded image and the data processing circuit may be an image decoding circuit for decoding the coded data into the decoded image data.

The memory control circuit may arbitrate and schedule the memory access operations of writing and reading the coded data and decoded image data to and from the dynamic random access memory as well as a memory access operation of refreshing the dynamic random access memory. The image decoding apparatus may further comprise a display circuit for reading the decoded image data out of the memory and outputting a display data.

In addition, according to the present invention, there is also provided a semiconductor integrated circuit comprising a data processing circuit for processing a first type of data and providing a second type of data; and a memory control circuit for controlling a memory that stores the first and second types of data in a time sharing manner, changing the priority of memory access operations of writing and reading the first and second types of data to and from the memory depending on a situation of the memory, and arbitrating and scheduling the memory access operations according to the changed priority, thereby avoiding concentration on or rejection of a specific memory access operation and eliminating an ineffective period.

The semiconductor integrated circuit may further comprise a display circuit for reading the decoded image data out of the memory and outputting display data.

BRIEF DESCRIPTION OF THE DRAWINGS

The present invention will be more clearly understood from the description of the preferred embodiments, as set forth below, with reference to the accompanying drawings wherein:

FIG. 12 is a block diagram showing an example of a priority encoder portion provided in the memory access arbitrator of the image decoding LSI according to the present invention; and FIG. 13 is a diagram for explaining the priorities of memory access operations changed by the memory access arbitrator.

DESCRIPTION OF THE PREFERRED EMBODIMENTS

First, the principles of the present invention will be explained with reference to FIGS. 1 and 2.

A method of controlling operations to access a memory 4 according to a first aspect of the present invention changes the priority of the operations according to the situation of the memory 4 and arbitrates and schedules the operations according to the changed priority. Therefore, according to the first aspect of the present invention, the concentration on or rejection of a specific memory access operation can be avoided, and an ineffective period can be eliminated.

The memory 4 is a volatile semiconductor memory that requires a refresh operation. The memory 4 is time-shared by different types of data. The first aspect of the present invention arbitrates and schedules memory access operations of writing and reading different types of data to and from the memory 4 and a memory access operation of refreshing the memory 4.

An image decoding apparatus (FIG. 1) according to a second aspect of the present invention has a data processor 1 for processing a first type of data and providing a second type of data, a memory 4 for storing the first and second types of data in a time sharing manner, and a memory controller 2 for changing the priority of memory access operations of writing and reading the first and second types of data to and from the memory 4 according to the situation of the memory 4 and arbitrating and scheduling the operations according to the changed priority.

An LSI (FIGS. 1 and 2) according to a third aspect of the present invention has a data processor 1 for processing a first type of data and providing a second type of data, a memory 4 for storing the first and second types of data in a time sharing manner, and a memory controller 2 for controlling the memory 4 by changing the priority of memory access operations of writing and reading the first and second types of data to and from the memory 4 according to the situation of the memory 4 and by arbitrating and scheduling the operations according to the changed priority.

The first type of data may be a coded (compressed) image, the second type of data may be a decoded image, and the data processor 1 may be a decoder for decoding the coded image into the decoded image.

The method according to the first aspect of the present invention changes the priority of operations to access the memory 4 according to the situation of the memory 4 and arbitrates and schedules the operations according to the changed priority. Namely, the priority of the refresh operation of the memory 4 and the writing and reading operations of different types of data to and from the memory 4 is changed according to the situation of the memory 4, and these operations are arbitrated and scheduled according to the changed priority.

Consequently, the present invention realizes an efficient memory system without increasing the capacity of a buffer memory, the width of a memory bus, or the operating frequency.

Figure 1:
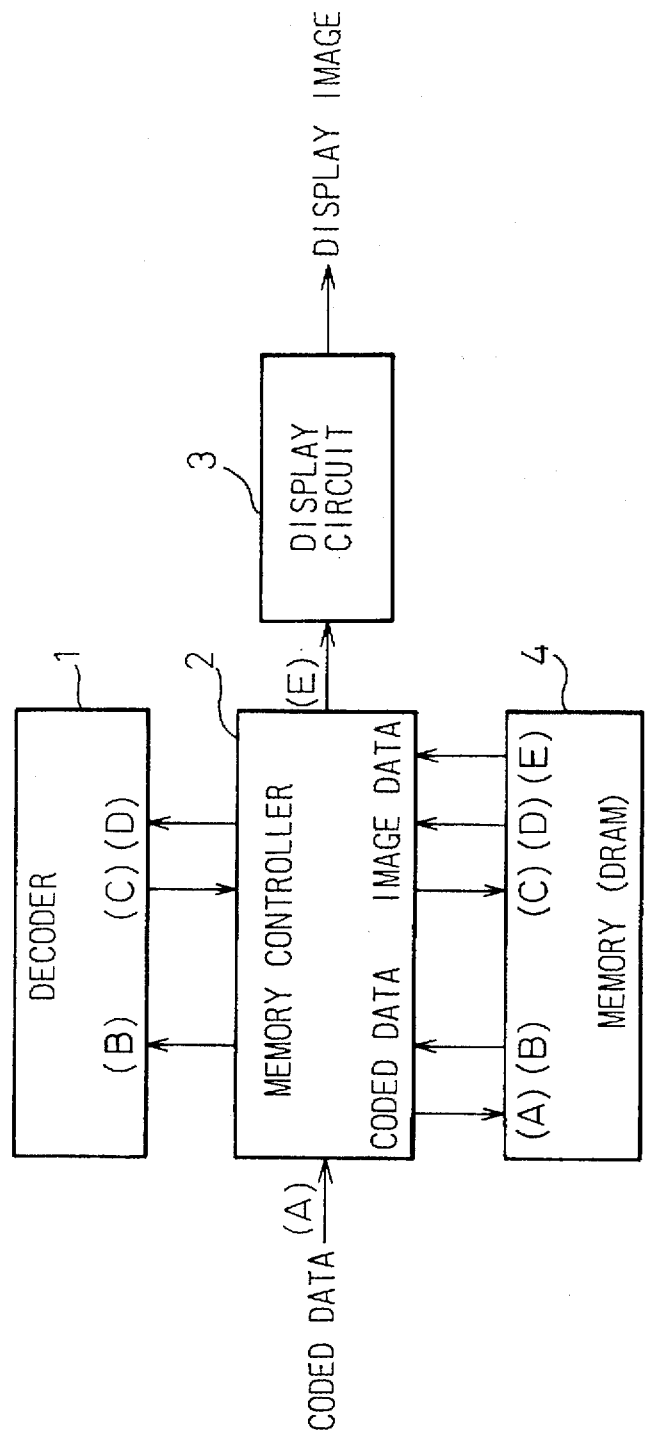
FIG. 1 is a block diagram showing the essential parts of an image decoding apparatus according to the present invention.

The image decoding apparatus of FIG. 1 may decode data compressed according to MPEG-2 (Moving Picture Experts Group Phase 2) and provide a display image. The apparatus has a data processor (decoder) 1, a memory controller 2, a display circuit 3, and a dynamic random access memory (DRAM) 4.

The memory 4 is time-shared by coded and decoded images (coded data and decoded image data). In FIG. 1, a memory access operation A of FIG. 1 writes a coded image in the memory 4 through the memory controller 2. A memory access operation B reads the coded image out of the memory 4 and transfers the same to the decoder 1 through the memory controller 2. A memory access operation C decodes the coded image by the decoder 1 and stores the decoded imaged in the memory 4 through the memory controller 2. A memory access operation D uses the image of a preceding field or frame as a reference image when decoding the coded image.

A memory access operation E reads the decoded image out of the memory 4 and supplies the same to the display circuit 3 through the memory controller 2. The preceding image of a part thereof read out of the memory 4 is supplied to the decoder 1 through the memory controller 2 and is used to decode or expand the coded image.

In this way, the memory 4 is time-shared by different types of data through the memory access operations A to E. The memory (DRAM) 4 needs a refresh operation to maintain the contents thereof. Accordingly, there are memory access operations not only of writing and reading coded and decoded images to and from the memory 4 but also of refreshing the memory 4. The memory controller 2 handles these operations and provides access permission signals in a time sharing manner.

To effectively use a memory bandwidth and minimize a memory capacity, the method according to the first aspect of the present invention decodes a coded image through the steps of:

(1) carrying out variable-length control on each memory access operation to access a required quantity of data in a memory;

(2) arbitrating and scheduling memory access operations according to the priority thereof;

(3) changing the priority of memory access operations depending on the situation of the memory, to avoid concentration on or refection of a specific memory access operation and eliminate an ineffective period; and (4) making the priority of a memory access operation of reading a coded image higher than the priority of other memory access operations.

According to the first aspect of the present invention, each memory access operation involves a small quantity of data, and higher priority is given to a memory access operation of reading a coded image, so that the coded image may be read out of the memory at a high speed. An area consumed by a coded image in the memory is smaller, than an area consumed by a decoded image in the memory. Accordingly, the ratio of a memory access time for the coded image to a total memory access time will be small even if the memory access operation of reading a coded image is given higher priority.

The first aspect of the present invention arbitrates operations to access the memory according to a priority of operations that is changed depending on the situation of the memory. This technique prevents a concentration on memory access operations to a specific period, a waste of time in other periods, or a long wait time for a memory access operation whose priority is low. The first aspect of the present invention is capable of stably handling memory access operations even under the worst case that high-speed dynamic image processing operations, each involving a large quantity of data, successively occur.

The volume of a coded image is limited to below a given value when coding an original image. Accordingly, it is possible to estimate the quantity of codes to be accessed in the memory for each image. It is also possible to estimate the quantity of decoded data to be accessed in the memory for each image according to the size and type of the image. The maximum quantity of data to be accessed in the memory for an image serves as useful information to completely decode the image in a given period such as a display period. It is possible, therefore, to share the memory between coded and decoded images.

Figure 2:
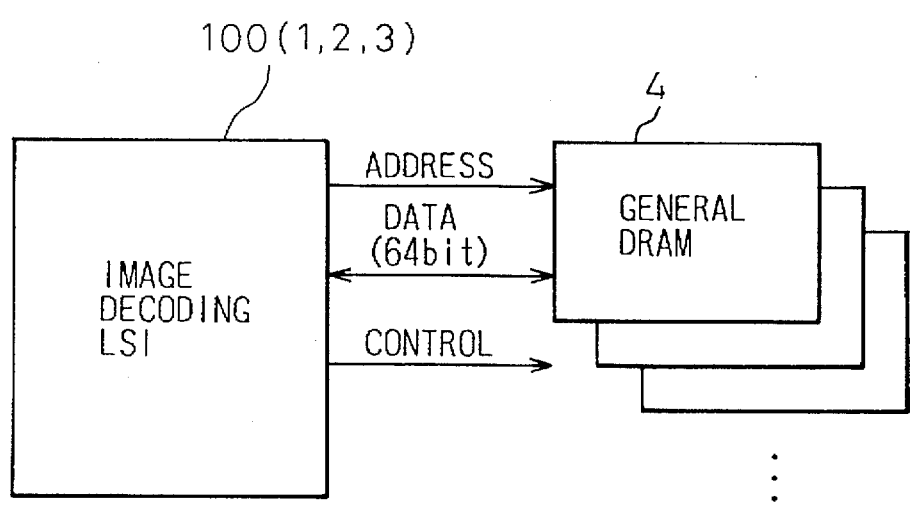
FIG. 2 is a block diagram showing the essential parts of an LSI according to the present invention.
Figure 3:
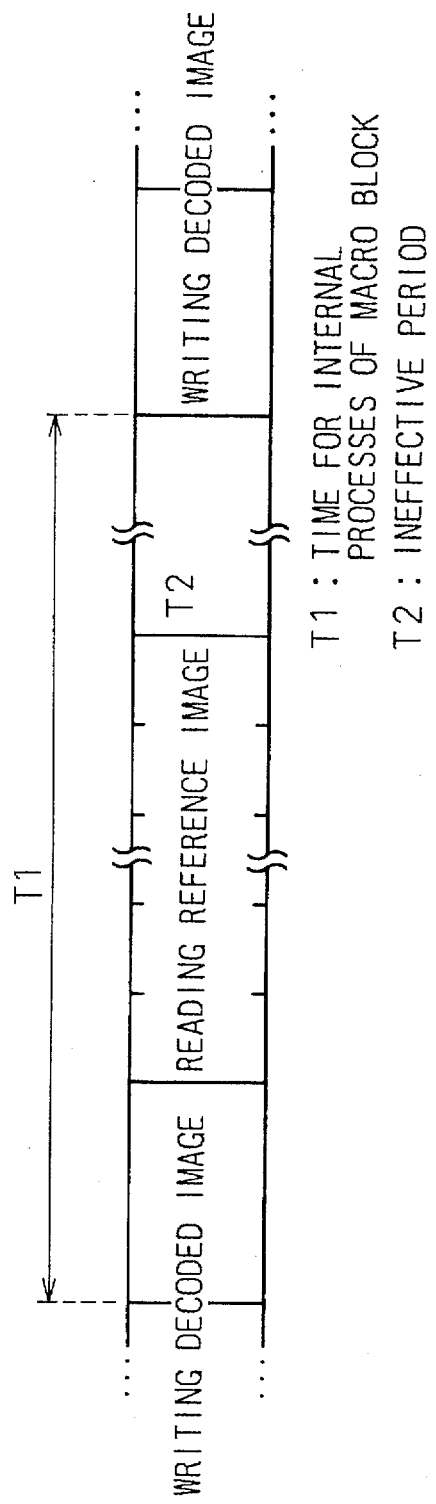
FIG. 3 is a diagram for explaining the characteristic operation of the image decoding apparatus according to the present invention.

The LSI of FIG. 2 is applicable to decoding an image compressed according to MPEG-2. FIG. 3 shows the characteristic operation of the second aspect of the present invention.

The memory 4 of FIG. 2 consists of general-purpose DRAMs, for example, four or eight 4-megabit DRAMs, which are operated under a high-speed page mode through a 64-bit data bus, to secure a memory bandwidth of about one gigabits per second. This provides a mean memory bandwidth sufficient for decoding MP/ML (main profile/main level) images according to the MPEG-2.

It is important to consider a memory bandwidth for a worst case and to secure a time for internal processes for a macro block of 16×16 pixels that is a base unit when decoding a compressed image according to the MPEG-2.

In FIG. 3, a period T1 is the time for the internal processes of a macro block. The period T1 includes a minimum memory access period of, for example, 24 microseconds for writing a decoded image and reading a reference image. The period T1, therefore, may involve an ineffective period T2 in which no memory access is carried out.

To avoid such an ineffective period T2, the image decoding apparatus of the second aspect of the present invention and the LSI of the third aspect thereof enable non-urgent memory access operations, such as the memory refresh operation (R) and coded image write operation, during the period T2 between the reference image read operation and the decoded image write operation. At the same time, the second and third aspects change the priority of memory access operations, depending on the situation of the memory, and arbitrate and schedule the operations accordingly. More precisely, the second and third aspects change the priority of memory access operations such as the coded image write operation A, coded image read operation B, decoded image write operation C, reference image read operation D, decoded image read operation E, and memory refresh operation R depending on the situation of the memory, such as the preceding access to the memory, and adaptively schedule the operations according to the changed priority.

The present invention provides the coded image read operation B with the highest priority, because it momentarily requires a high operating speed. To reduce a memory access wait time, the reference image read operation is made section-by-section. The MPEG-2 refers to different sections of an image that differ from one another positionally and temporally. Accordingly, the memory access time of the reference image read operation will be shortened if the reference image is read section-by-section.

The coded image read operation momentarily requires a high operation speed depending on an image to be decoded. The speed, however, is averaged over a screen, a field, or a frame, and the image will be recovered if all codes for the image are read. Accordingly, when the coded image read operation requires a high operation speed, the priority of this operation is made higher than that of the reference image read operation and decoded image write operation. In this case, the decoded image read operation is temporarily suspended.

The maximum quantity of coded data for a screen is determined by a bit rate prescribed by the MPEG-2 and the size of a reception buffer. According to this maximum quantity, a total period for which the decoded image read operation is suspended is calculated. A result of the calculation is used to surely complete a decoding operation for a screen within a display period.

In this way, the memory 4 is shared by coded and decoded images without providing the memory with the total memory bandwidth necessary for a coded image and a decoded image.

The present invention, therefore, realizes an efficient memory system without increasing the capacity of a buffer memory, the width of a memory bus, or the operating frequency.

An image decoding apparatus and an LSI according to the present invention will be explained.

Figure 4:
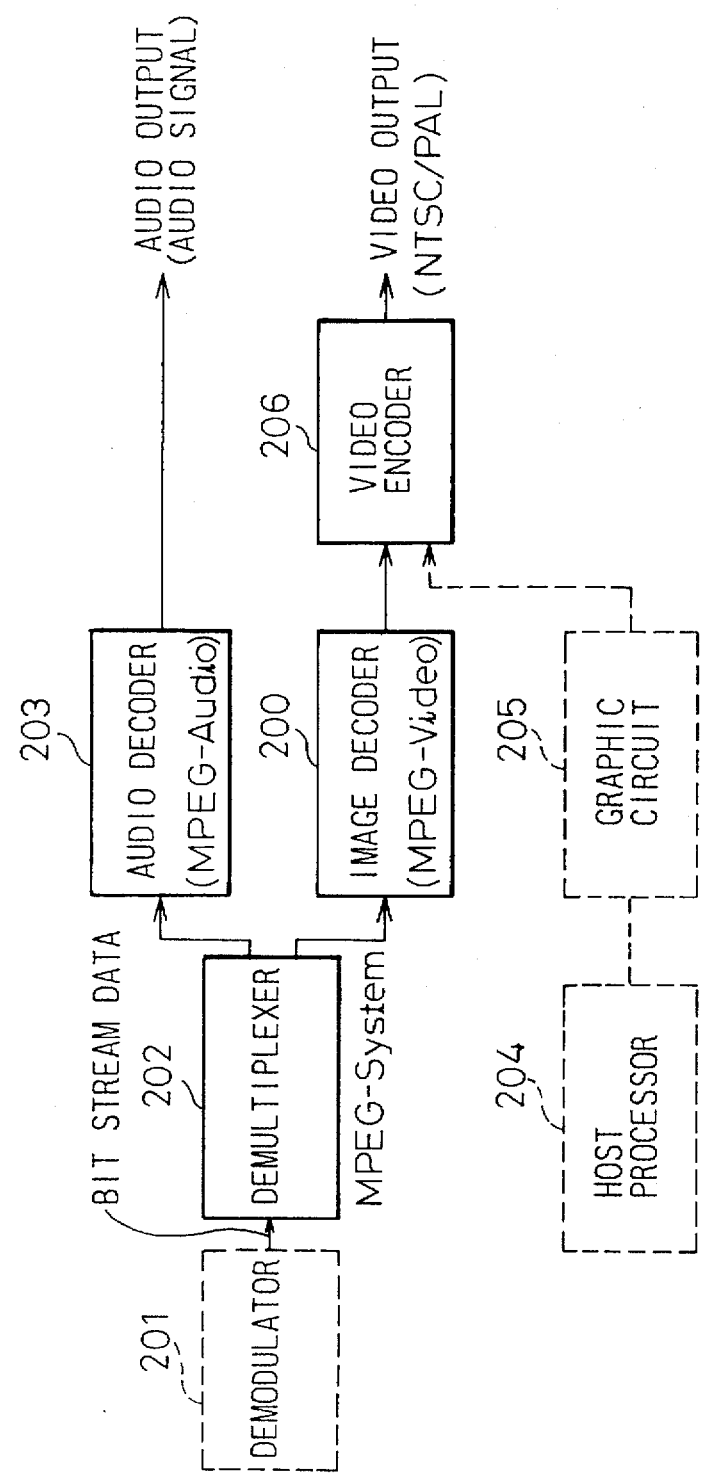
FIG. 4 is a block diagram showing an image decoding apparatus according to an example of the present invention.

FIG. 4 is a block diagram showing the image decoding apparatus according to an embodiment of the present invention. The apparatus involves an image decoder 200, a demodulator 201, a demultiplexer 202, an audio decoder 203, a host processor 204, a graphic circuit 205, and a video encoder 206.

The demodulator 201 demodulates satellite broadcasting digital signals, cable television signals, digital video disc signals, etc., into a bit stream of multiplexed video, audio, and other data. The demultiplexer 202 demultiplexes the bit stream into audio codes and a coded image. The multiplexing and demultiplexing are carried out according to, for example, the MPEG System.

The audio decoder 203 decodes the audio codes into audio data according to, for example, MPEG Audio coding. The audio decoder 203 may be a digital signal processor (DSP).

The image decoder 200 decodes the coded image into a decoded image according to, for example, MPEG Video coding. The image decoder 200 may be made of a dedicated LSI 100 and a DRAM 4.

The video encoder 206 converts the digital image output of the image decoder 200 into video signals such as NTSC (National Television System Committee) or PAL (Phase Alternation by Line) video signals that are displayed on a standard television set. The host processor 204 controls the image decoding apparatus and employs a high-performance 32- or 64-bit CPU to realize services such as VOD (video on demand). The graphic circuit 205 provides graphic screens to display program information, menus, etc.

Figure 5:
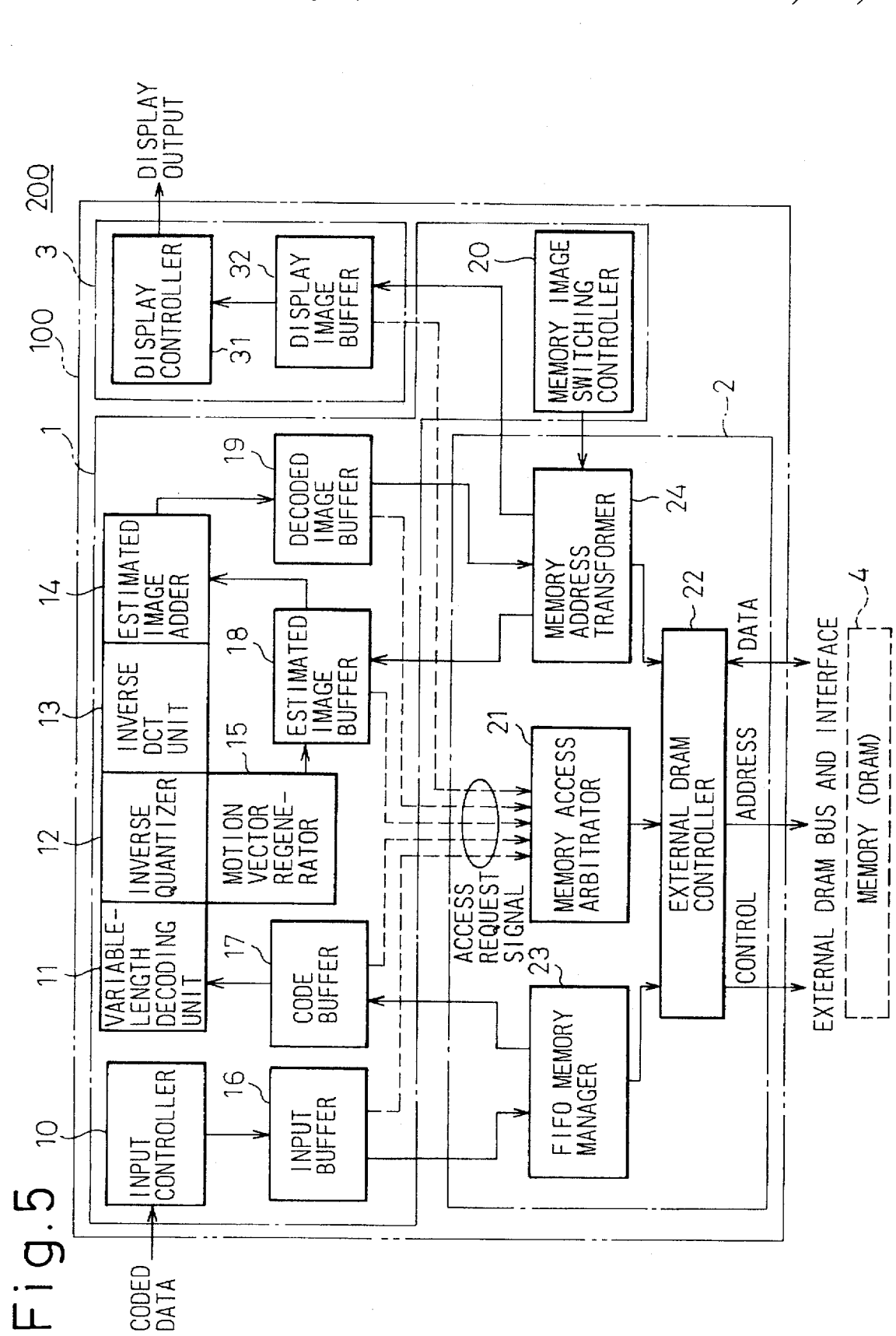
FIG. 5 is a block diagram showing an image decoding LSI according to an embodiment of the present invention.

FIG. 5 is a block diagram showing the image decoder 200 composed of the image decoding LSI 100 and external memory (DRAM) 4. The LSI 100 has an input controller 10, a variable-length decoder 11, an inverse quantizer 12, an inverse discrete cosine transform unit (inverse DCT unit) 13, an estimated image adder 14, a motion vector regenerator 15, an input buffer 16, a code buffer 17, an estimated image buffer 18, a decoded image buffer 19, and a memory switching controller 20. The LSI 100 also has a memory access arbitrator 21, a memory controller 22, a FIFO (first in first out) memory manager 23, a memory address transformer 24, a display controller 31, and a display image buffer 32.

As is apparent from a comparison between FIGS. 1 and 5, the decoder (data processor) 1 has the input controller 10, variable-length decoder 11, inverse quantizer 12, inverse DCT unit 13, estimated image adder 14, motion vector regenerator 15, input buffer 16, code buffer 17, estimated image buffer 18, decoded image buffer 19, and memory switching controller 20.

The input controller 10 receives a bit stream of coded data, detects header data if required, discards unnecessary data, and detects the picture header of an image. The variable-length decoder 11 decodes variable-length codes (Huffman codes) contained in the bit stream into fixed-length codes and extracts various parameters. The inverse quantizer 12 converts data (coefficient data) related to an image among the fixed-length codes into data to be processed by the inverse DCT unit. Original data is transformed into real numbers by DCT (discrete cosine transform), and the real numbers are quantized (divided into integers). The inverse quantization is a process to restore the real numbers.

The motion vector regenerator 15 picks up motion vectors out of the output of the inverse quantizer 12. To improve the efficiency of image compression, MPEG-2 employs the difference between a current image and a preceding image (a reference image). The motion vectors serve as information to indicate the position of the reference image and is used to read the reference image.

A DCT operation is mainly composed of matrix multiplications to transform the coordinate axes of a matrix of 8×8 into frequency components. The inverse DCT unit 13 transforms the frequency components into the coordinate axes of a matrix of 8×8.

The estimated image adder 14 adds a reference image provided by the motion vector regenerator 15 to pixel data provided by the inverse DCT unit 13, to generate a final decoded image. The memory switching controller 20 controls the addresses of the memory 4 to store the decoded image, the reference image, or the display image into the external memory 4. The decoded image may become a reference image and a display image so the address of the image in the memory 4 is successively changed.

In FIGS. 1 and 5, the memory controller 2 has the memory access arbitrator 21, memory controller 22, FIFO memory manager 23, and memory address transformer 24.

The memory access arbitrator 21 arbitrates the memory access operations A to E of FIG. 1 and the refresh operation R according to the priority thereof. The memory controller 22 controls the external memory 4. The memory controller 22 manipulates signal lines of the memory 4, to access the memory 4 and realizes continuous access operations in a high-speed page mode.

The FIFO memory manager 23 manages the addresses of the memory 4 and updates a write pointer and a read pointer thereof, to form an FIFO buffer in the memory 4. The FIFO buffer is used to store a coded image (a bit stream). The memory address transformer 24 transforms the address of the decoded image, the reference image, and the display image. Namely, the transformer 24 transforms the two-dimensional X and Y coordinates of any one of the decoded, reference, and display images into a linear address in the memory 4, and adds an offset value provided by the memory switching controller 20 to the linear address.

The display circuit 3 has the display controller 31 and display image buffer 32.

The display controller 31 displays the display image according to, for example, NTSC or PAL.

The buffers 16 to 19 and 32 are small-capacity buffers corresponding to the respective memory access operations. These buffers share the memory 4 and absorb speed differences with respect to the memory 4.

Figure 6:
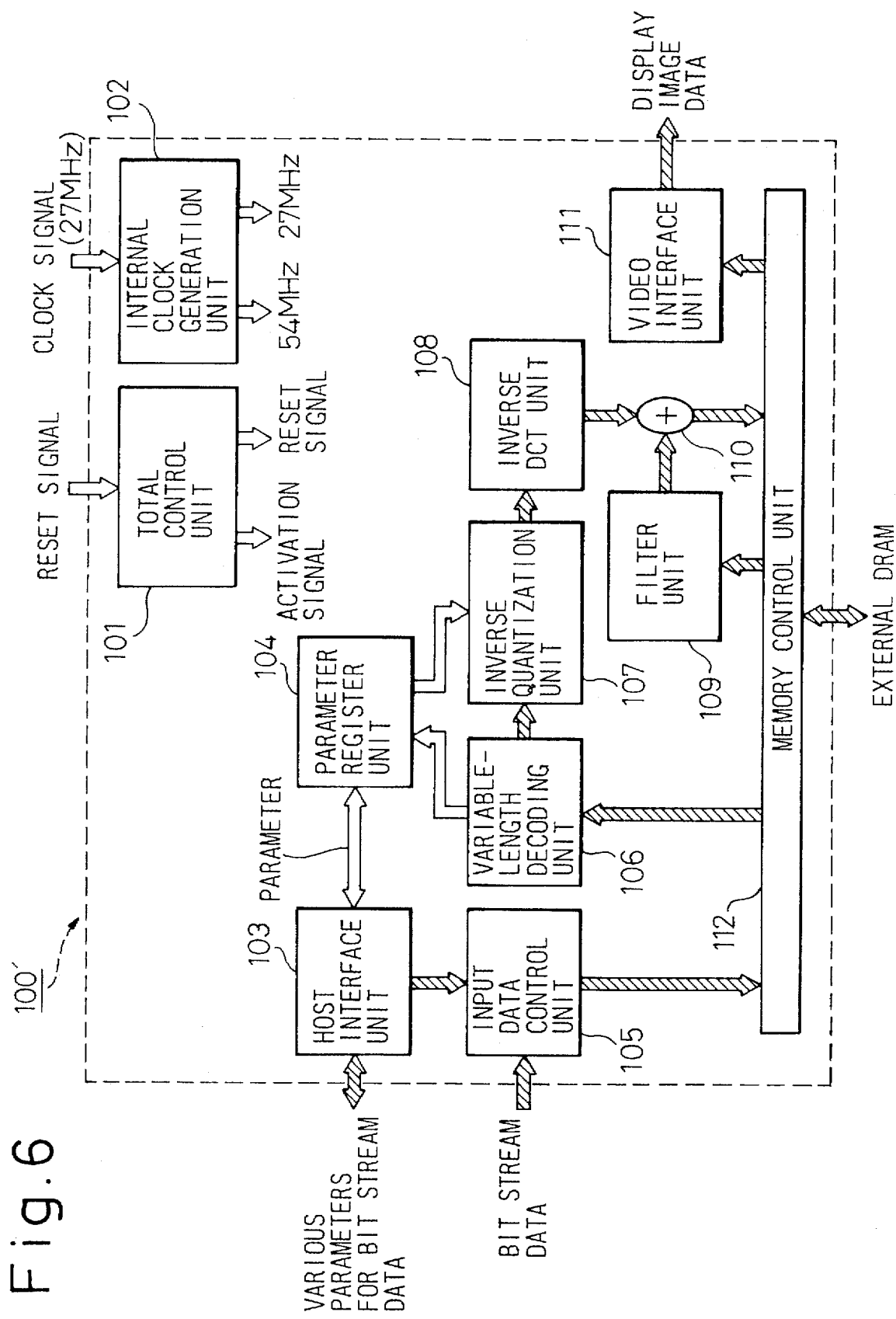
FIG. 6 is a functional block diagram showing an image decoding LSI according to another embodiment of the present invention.

FIG. 6 is a functional block diagram showing an image decoding LSI 100' according to another embodiment of the present invention.

In FIG. 6, reference numeral 101 represents a control unit, 102 represents an internal clock generation unit, 103 represents a host interface unit, 104 represents a parameter register unit, 105 represents an input data control unit, and 106 represents a variable-length decoding unit. Further, reference numeral 107 represents an inverse quantization unit, 108 represents an inverse discrete cosine transform unit (inverse DCT unit), 109 represents a filter unit, 110 represents an adder, 111 represents a video interface unit, and 112 represents a memory control unit.

By comparing the image decoding LSI 100' shown in FIG. 6 with the image decoding LSI 100 shown in FIG. 5, the input data control unit 105 of FIG. 6 corresponds to the input controller 10 and input buffer 16 of FIG. 5, the variable-length decoding unit 106 corresponds to the variable-length decoder 11 and code buffer 17, and the filter unit 109 corresponds to the motion vector regenerator 15, estimated image buffer 18 and decoded image buffer 19. Further, the video interface unit 111 of FIG. 6 corresponds to the display circuit 3 having the display controller 31 and display image buffer 32 of FIG. 5, and the memory control unit 112 corresponds to the memory switching controller 20, memory access arbitrator 21, memory controller 22, FIFO memory manager 23 and memory address transformer 24. Note that the inverse quantization unit 107, inverse DCT unit 108 and adder 110 of FIG. 6 correspond to the inverse quantizer 12, inverse DCT unit 13 and estimated image adder 14 of FIG. 5, respectively.

The total control unit 101 controls various operations of respective blocks, an error reset operation, and interruption operations for the host CPU. Namely, the total control unit 101 carries out (1) management of a picture number in the buffer memory synchronizing with a display V-sync signal, management of displaying and decoding a picture field (frame) structure, management of a macro block address and number, and activation of the various units, (2) a reset operation in accordance with an establishment of the host CPU, and (3) notification to the host CPU of detection a picture header and completion of the decode operation through the parameter register unit 104, displaying a V-sync signal, B-picture skip, overflow and underflow of the buffer memory, and interruptions of decoding and system errors.

The internal clock generator unit 102 includes a PLL macro unit which is supplied with a basic clock signal (27 MHz) from outside the image decoding LSI 100', and generates two kinds of internal clock signals (27 MHz and 54 MHz) and distributes these internal clock signals to the respective blocks. The host interface unit 103 includes an interface function for connecting the image decoding LSI 100' to various types of CPU (different CPUs), and accesses various blocks of the LSI.

The parameter register unit 104 comprises an initializing parameter register for the initializing parameters output from the host CPU, a command register, and parameter registers for a plurality of parameters detected in the MPEG bit stream.

Figure 7:
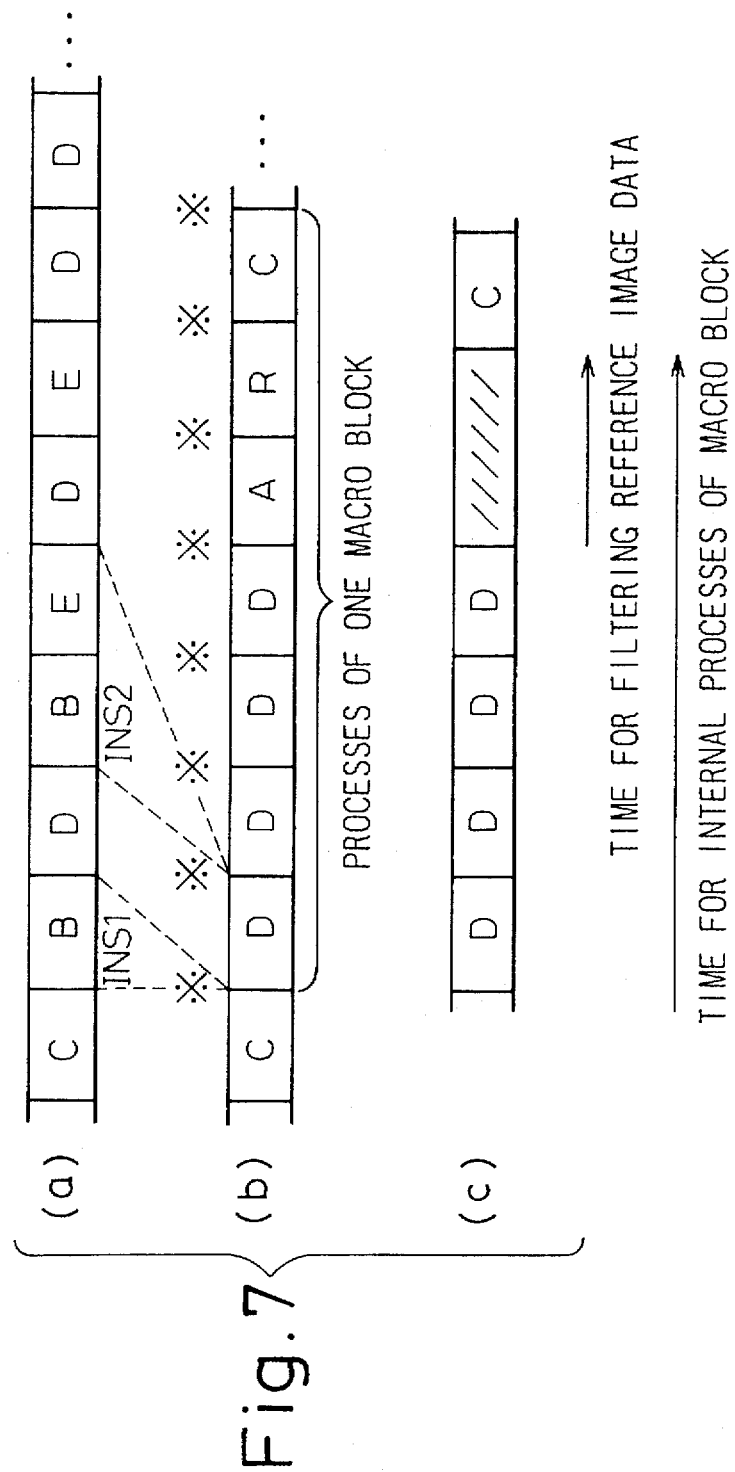
FIG. 7 is a diagram for explaining the operation of the image decoding LSI according to the present invention.

FIG. 7 explains the operation of the LsI 100 of FIG. 5 according to MPEG-2. MPEG-2 sometimes reads different parts of a reference image. For example, the reference image is divided into four rectangle (quadrangle) parts, which are read one by one. Each of these parts may be divided into luminance information and chrominance (color difference) information, to divide the reference image into eight parts (4×2=8).

In FIG. 7, reference marks A to E correspond to the memory access operations of FIG. 1, and a reference mark R is the refresh operation of the memory 4. Namely, the reference marks A to E are specified as following Table 1.

TABLE 1

| A | Coded Image Write Operation |
| B | Coded Image Read Operation |
| C | Decoded Image Write Operation |
| D | Reference Image Read Operation |
| E | Display Image Read Operation |

The coded image read operation B and display image read operation E always receive high priority, so that they are enabled as soon as they occur.

In FIG. 7, a reference (a) shows examples of actual memory access operations. As shown in the reference (a) of FIG. 7, in processing one macro block shown in a reference (b) of FIG. 7, the coded image read operation B is inserted in a period INS1 between the decoded image write operation C and the reference image read operation D, and the coded image read operation B and display image read operation E are inserted in a period INS2 between the two reference image read operations D.

As shown in a reference (c) of FIG. 7, a process time for one macro block must have a time for internal processes as well as a time for filtering a reference image. Namely, the period "//////" for completing the longer one is needed. If no memory access operation occurs during this period, the period will be ineffective.

To avoid such ineffectiveness, the priority of the coded image write operation A and refresh operation R each having a margin in an access period is properly changed so that they are carried out in a period between the reference image read operation D and the decoded image write operation C.

If the priority of the coded image write operation A and refresh operation R is fixed higher than the priority of the reference image read operation D and decoded image write operation C, the operation A and R will be between two reference image read operations D, to extend the filtering time. On the other hand, if the priority of the operations A and R is fixed at a level lower than the priority of the operations D and C, the operations A and R will be suspended by the display image read operation E or the coded image read operation B because the operations E and B involve the next reference image read operation D and coded image read operation B.

To solve this problem, the present invention changes the priority of the memory access operations depending on the situation of the memory 4.

Figure 8:
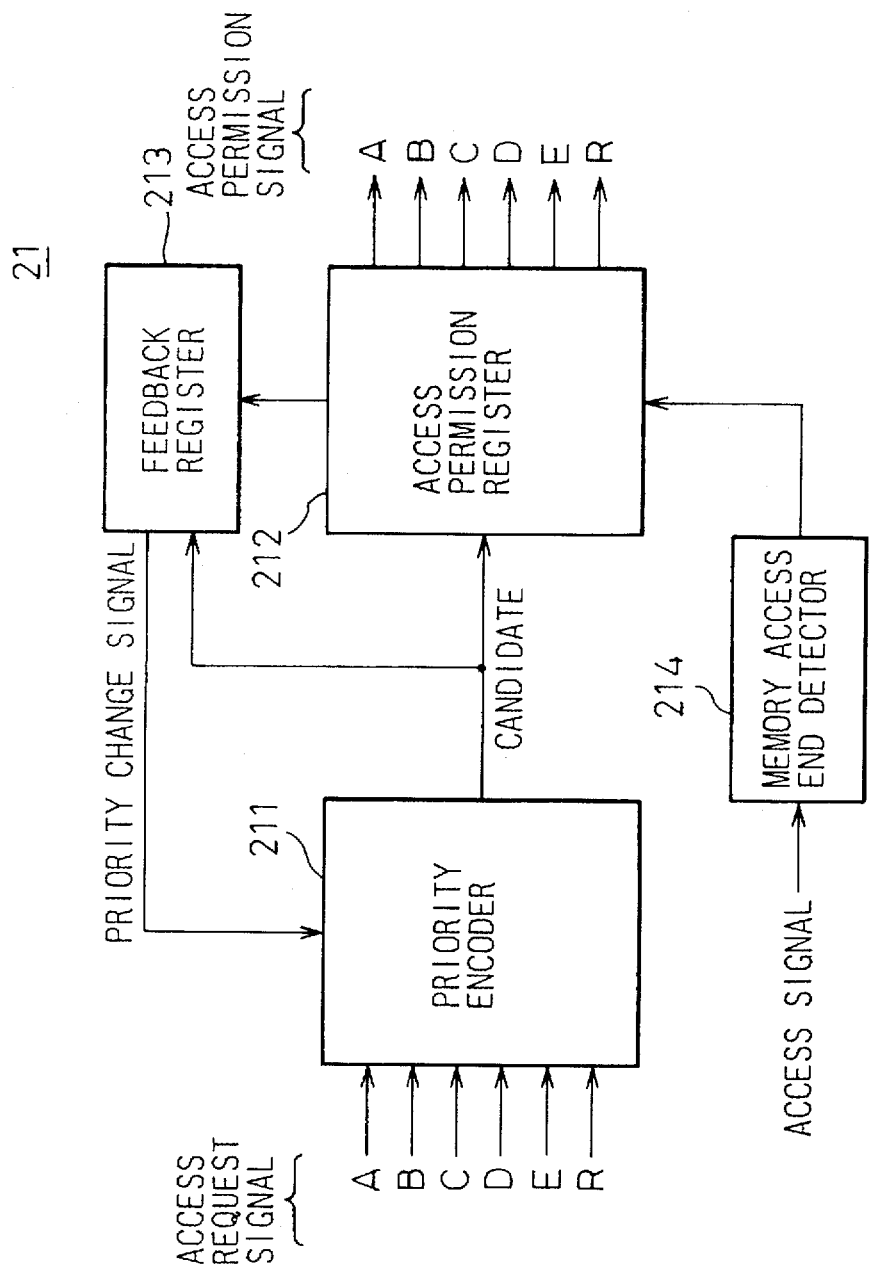
FIG. 8 is a block diagram showing a memory access arbitrator of the image decoding LSI according to the present invention.

FIG. 8 is a block diagram showing an example of the memory access arbitrator 21 of the LSI of FIG. 5. The memory access arbitrator 21 has a priority encoder 211 for receiving access request signals for the memory access operations A to E and R, an access permission register 212 for providing access permission signals for the operations A to E and R, a feedback register 213, and a memory access end detector 214 for detecting the end of a memory access operation.

The priority encoder 211 encodes the access request signals and finds a candidate for the next memory access. The priority encoder 211 always encodes memory access signals. A memory access operation having the highest priority at the time will be the candidate for the next memory access.

The candidate selected on the completion of a memory access or when there is no memory access is held in the access permission register 212. If the candidate is one of the reference image read operation D, coded image write operation A, and refresh operation R, the candidate is stored in the feedback register 213, too.

The contents of the feedback register 213 are fed back as a priority change signal to the priority encoder 211, to change the priority of access request signals. The access permission register 212 provides an access permission signal for the candidate memory access operation.

Figure 9:
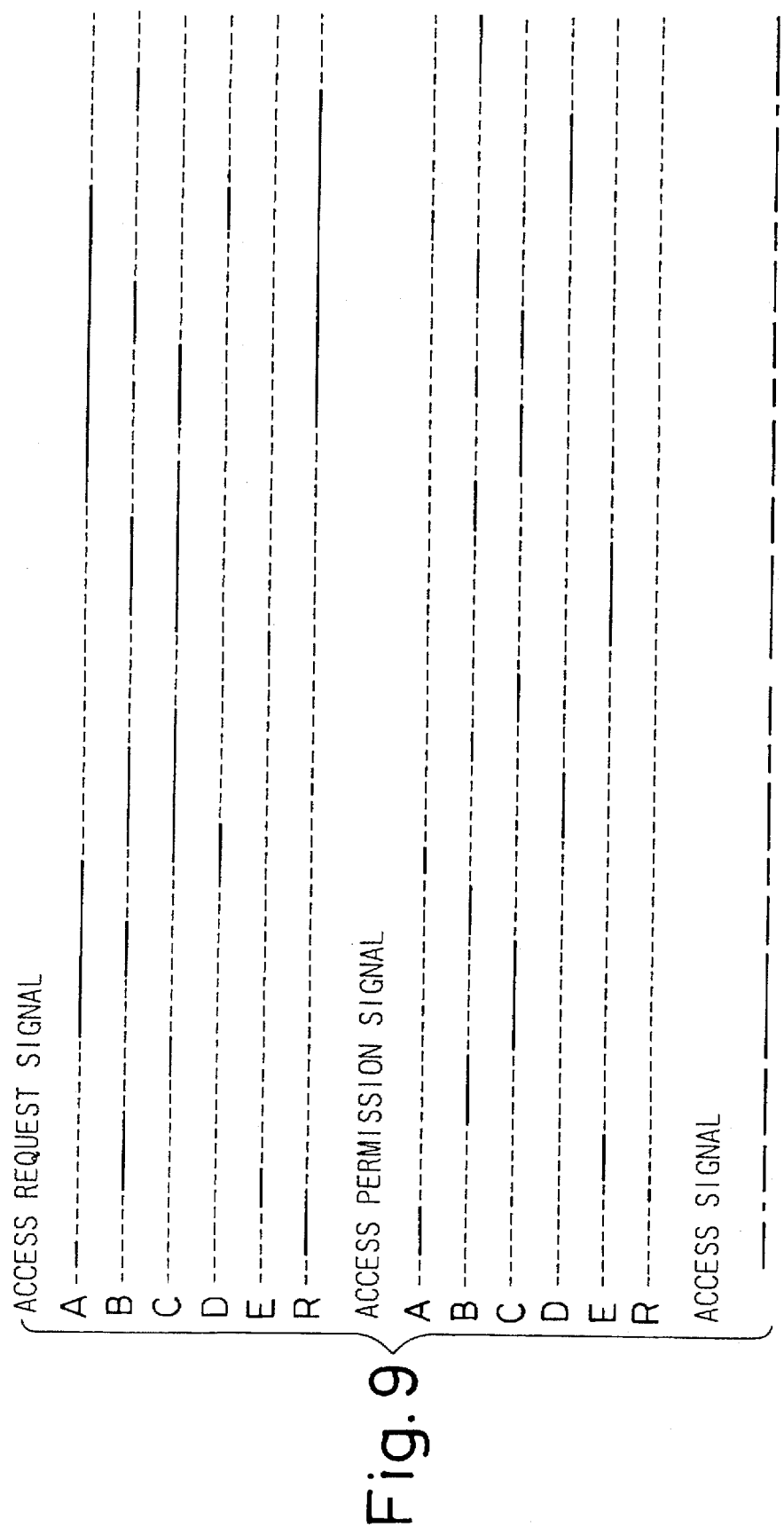
FIG. 9 is a timingchart showing the operations of the memory access arbitrator of the image decoding LSI according to the present invention.
Figure 10:
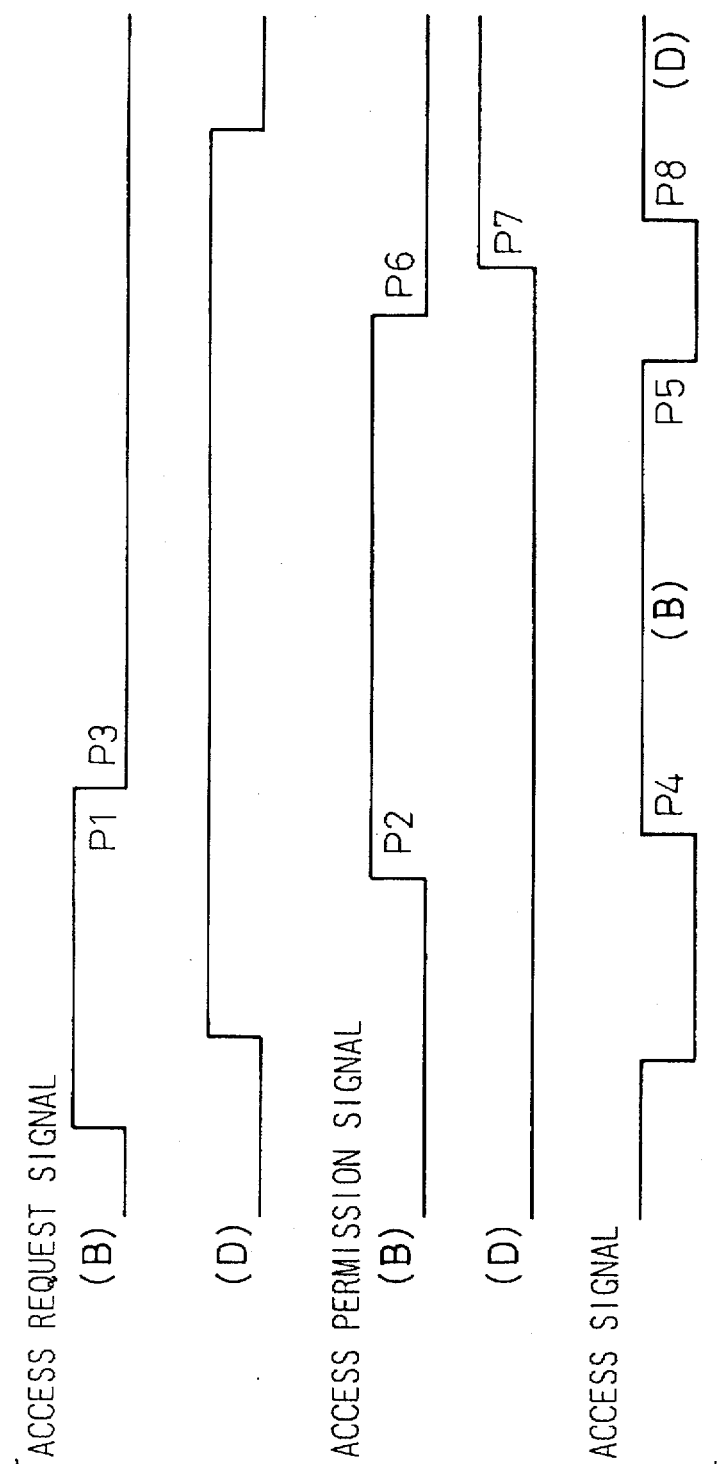
FIG. 10 is a timingchart showing the relationships between an access request signal, an access permission signal, and an access signal used in the memory access arbitrator of the image decoding LSI according to the present invention.

FIG. 9 shows the operations of the memory access arbitrator of the image decoding LSI according to the present invention, and FIG. 10 shows the relationship among an access request signal, an access permission signal, and an access signal used in the memory access arbitrator of the image decoding LSI according to the present invention.

As shown in FIG. 9, the access request signals for the coded image write operation A, coded image read operation B, decoded image write operation C, reference image read operation D, display image read operation E and refresh operation R are input to the memory access arbitrator (21), and the access permission signals A to E and R are output from the memory access arbitrator, in accordance with the priorities of the respective times, so that the access signal is formed and various memory accesses are carried out.

Concretely, the relationship among the access request signals and access permission signal for the coded image read operation B and reference image read operation D, and the access signal used in the memory access arbitrator will be explained with reference to FIG. 10.

First, as shown in FIG. 10, in the case that an access request signal for the coded image read operation B is output (high level "H") and another request signal for the reference image read operation D is output, the access request signal for the coded image read operation B is maintained until an access permission signal for the coded image read operation B is output, with reference to a reference P1. Note that the access request signal for the reference image read operation D is also maintained until an access permission signal for the reference image read operation D is output.

Next, the access permission signal is output (high level "H") by the memory access arbitrator (21), in accordance with the priority at this time (with reference to a reference P2). Note that, in this case shown in FIG. 10, the access permission signal is output for the coded image read operation B. Further, the access request signal for the coded image read operation B is negated (low level "H"), after confirming the access permission signal for the coded image read operation B, with reference to a reference P3. In addition, an access signal is output (high level "H") from a specific circuit which receives the access permission signal for the coded image read operation B output at the time (P2), and the specific circuit starts a memory access (coded image read operation B), with reference to a reference P4.

Further, after completing the coded image read operation B (memory access), the access signal is negated (low level "L"), with reference to a reference P5. Further, the access permission signal for the coded image read operation B is negated (low level "L") by detecting the negation of the access signal and the resetting the access permission register (212), with reference to a reference P6.

In addition, the memory access arbitrator (21) confirms the state where no access permission signal is output, and establishes the contents of the priority encoder (211), in the access permission register (212), with reference to a reference P7. Namely, an access permission signal is output for the access request signal of the operation having the highest priority at that time. Concretely, the access permission signal is output (high level "H") for the access request signal of the reference image read operation D. Further, an access signal is output from another specific circuit which receives the access permission signal for the reference image read operation D output at the time (P7), and the another specific circuit starts a memory access (reference image read operation D), with reference to a reference P8.

Figures 11A, 11B:
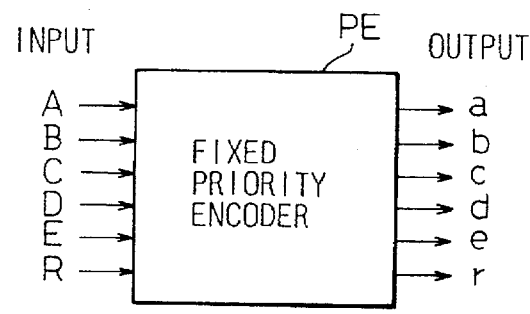
FIG. 11A is a diagram showing a fixed priority encoder provided in the memory access arbitrator of the image decoding LSI according to the present invention.
FIG. 11B is a diagram showing an example of a logical formula corresponding to a specific priority to be set in the fixed priority encoder shown in FIG. 11A.

FIG. 11A shows a fixed priority encoder provided in the memory access arbitrator (21) of the image decoding LSI according to the present invention, and FIG. 11B shows an example of a logic formula corresponding to a specific priority to be set in the fixed priority encoder shown in FIG. 11A. In FIG. 11B, a reference "¯" represents a logic "NOT", and a reference "&" represents a logic "AND", respectively.

The fixed priority encoder PE shown in FIG. 11A receives input signals A, B, C, D, E and R, and outputs output signals a, b, c, d, e and r in accordance with a specific priority.

The logic formula shown in FIG. 11B is used to realize a priority "B>E>D>A>R>C". Namely, when the fixed priority encoder PE shown in FIG. 11A is constituted in accordance with the logic formula shown in FIG. 11B, the priority "B>E>D>A>R>C" is established in the fixed priority encoder PE.

FIG. 12 shows an example of a priority encoder portion (211) provided in the memory access arbitrator (21) of the image decoding LSI according to the present invention.

As shown in FIG. 12, the priority encoder portion comprises a plurality of fixed priority encoders PE-1 to PE-n, and a selector SEL. The selector SEL selects and outputs a specific one (which is the most preferable priority) among the priorities established in the respective fixed priority encoder PE-1 to PE-n. Concretely, the fixed priority encoder PE-1 establishes (stores) a priority "B>E>D>A>R>C", and the fixed priority encoder PE-n stores a priority "B>E>C>D>A>R". Note that the logical formula of fixed priority encoder PE-1 is the same as that of the fixed priority encoder PE shown in FIG. 11A (since their priorities "B>E>D>A>R>C" are the same), but the logical formula of fixed priority encoder PE-n can be determined corresponding to the priority "B>E>C>D>A>R" thereof.

FIG. 13 is a diagram for explaining priorities of memory access operations (A to E and R) changed by the memory access arbitrator. In FIG. 13, reference marks F1 to F5 represent memory access operations just carried out. For each of these situations F1 to F5, the memory access arbitrator 21 of FIG. 8 determines the priority of the memory access operations A to E and R.

Under the situation F1 just (i.e., immediately) after a reset operation, the priority of the memory access operations is the coded image read operation B>the display image read operation E>the reference image read operation D>the coded image write operation A>the refresh operation R>the decoded image write operation C. Under the situation F2 just (i.e., immediately) after the reference image read operation D, the priority is B>E>D>A>R>C. In this way, the priority of the memory access operations is changed depending on the situation of the memory. Under the situation F2 just after the reference image read operation D, the priority of the reference image read operation D is high to allow it to be uninterruptedly repeated as often as possible.

Under the situation F3 just after the coded image write operation A, the priority is changed to B>E>R>C>D>A. Under the situation F4 just (i.e., immediately) after the refresh operation R, the priority is changed to B>E>C>D>A>R. Under the situation F5 just (i.e., immediately) after the decoded image write operation C, the priority is changed to B>E>D>A>R>C.

In this way, the image decoding LSI or the image decoding apparatus according to the present invention changes the priority of memory access operations depending on the situation of a memory and arbitrates and schedules the operations according to the changed priority, thereby realizing an efficient memory system without increasing the capacity of a buffer memory, the width of a memory bus, or an operating frequency. In particular, the present invention is effective to improve the performance of decoding an image compressed according to the MPEG system.

The image decoding apparatus according to the present invention employs an undivided memory of minimum capacity to store all data necessary for decoding a coded image. Namely, according to the present invention, the efficiency of a memory system can be improved without increasing the capacity of a buffer memory, the width of a memory bus, or an operating frequency.

Many different embodiments of the present invention may be constructed without departing from the spirit and scope of the present invention, and it should be understood that the present invention is not limited to the specific embodiments described in this specification, except as defined in the appended claims.

What is claimed is:

1. A method of controlling memory access operations to access a memory, said memory being employed in an image decoding apparatus for decoding coded data of a compressed image into decoded image data of expanded coded data and being time-shared by said coded data and said decoded image data, comprising the steps of selectively changing respective priorities of said memory access operations, depending on a situation of said memory, and arbitrating and scheduling said operations according to said respective, changed priorities, thereby avoiding concentration on or rejection of a specific memory access operation and eliminating an ineffective period.

2. A method of controlling operations to access a memory as claimed in claim 1, wherein said memory is a volatile semiconductor memory requiring a refresh operation, and said method, further, arbitrates and schedules memory access operations of writing and reading said coded data and said decoded image data to and from said volatile semiconductor memory and a memory access operation of refreshing said volatile semiconductor memory.

3. A method of controlling operations to access a memory as claimed in claim 2, wherein said volatile semiconductor memory is a dynamic random access memory, wherein the memory access operations of said dynamic random access memory comprise a coded image write operation for writing the coded data in said dynamic random access memory, a coded image read operation for reading the coded data out of said dynamic random access memory, a decoded image write operation for decoding the coded data and writing the decoded image data in said dynamic random access memory, a reference image read operation for referring to an image data of a preceding field or frame as a reference image when decoding the coded data, a display image read operation for reading the decoded image data out of said dynamic random access memory and displaying the decoded image data, and a refresh operation for refreshing said dynamic random access memory.

4. A method of controlling operations to access a memory as claimed in claim 3, wherein non-urgent memory access operations, comprising at least said coded image write operation and said refresh operation, are carried out during a period between said decoded image write operation and said reference image read operation.

5. A method of controlling operations to access a memory as claimed in claim 3, wherein said coded image read operation is set at a highest priority in order to realize a high speed reading operation.

6. A method of controlling operations to access a memory as claimed in claim 3, wherein said coded image read operation is set to a higher priority than that of said decoded image write operation and that of said reference image read operation.

7. A method of controlling operations to access a memory as claimed in claim 3, wherein the respective priorities of the memory access operations are determined as follows, immediately after each of said reset operations, said reference image read operation and said decoded image write operation:

the priority of said coded image read operation>the priority of said display image read operation>the priority of said reference image read operation>the priority of said coded image write operation>the priority of said refresh operation>the priority of said decoded image write operation.

8. A method of controlling operations to access a memory as claimed in claim 3, wherein the respective priorities of the memory access operations are determined as follows, immediately after said coded image write operation:

the priority of said coded image read operation>the priority of said display image read operation>the priority of said refresh operation>the priority of said decoded image write operation>the priority of said reference image read operation>the priority of said coded image write operation.

9. A method of controlling operations to access a memory as claimed in claim 3, wherein the respective priorities of the memory access operations are determined as follows, immediately after said refresh operation:

the priority of said coded image read operation>the priority of said display image read operation>the priority of said decoded image write operation>the priority of said reference image read operation>the priority of said coded image write operation>the priority of said refresh operation.

10. A method of controlling operations to access a memory as claimed in claim 1, wherein the memory access operations are carried out by using a variable-length control method for accessing a required quantity of said coded data or of said decoded image data in said memory.

11. A method of controlling operations to access a memory as claimed in claim 1, wherein respective priorities of current memory access operations are determined in accordance with a preceding memory access operation.

12. An image decoding apparatus for decoding compressed and coded data comprising:
an image decoding circuit decoding coded data of a compressed image into decoded image data of expanded coded data and providing said decoded image data as an output;
a memory storing said coded data and said decoded image data in a time sharing manner; and
a memory control circuit selectively changing respective priorities of memory access operations of writing and reading to and from said memory depending on a situation of said memory, and arbitrating and scheduling the memory access operations according to said respective, changed priorities, thereby avoiding concentration on or rejection of a specific memory access operation and eliminating an ineffective period.

13. An image decoding apparatus decoding compressed and coded data as claimed in claim 12, wherein said memory is a dynamic random access memory.

14. An image decoding apparatus for decoding compressed and coded data as claimed in claim 13, wherein said memory control circuit arbitrates and schedules the memory access operations of writing and reading the coded data and the decoded image data to and from said dynamic random access memory and a memory access operation of refreshing said dynamic random access memory.

15. An image decoding apparatus for decoding a compressed and coded data as claimed in claim 13, wherein the memory access operations of said dynamic random access memory, arbitrated and scheduled by said memory control circuit, comprise a coded image write operation for writing the coded data in said dynamic random access memory, a coded image read operation for reading the coded data out of said dynamic random access memory, a decoded image write operation for decoding the coded data and writing the decoded image data in said dynamic random access memory, a reference image read operation for referring to an image data of a preceding field or frame as a reference image when decoding the coded data, a display image read operation for reading the decoded image data out of said dynamic random access memory and displaying the decoded image data, and a refresh operation for refreshing said dynamic random access memory.

16. An image decoding apparatus for decoding compressed and coded data as claimed in claim 15, wherein said memory control circuit arbitrates and schedules the memory access operations to carry out non-urgent memory access operations, comprising at least said coded image write operation and said refresh operations during a period between said decoded image write operation and said reference image read operation.

17. An image decoding apparatus for decoding compressed and coded data as claimed in claim 15, wherein said memory control circuit arbitrates and schedules the memory access operations to set said coded image read operation at a highest priority in order to realize a high speed reading operation.

18. An image decoding apparatus for decoding a compressed and coded data as claimed in claim 15, wherein said memory control circuit arbitrates and schedules the memory access operations to set said coded image read operation to a higher priority than that of said decoded image write operation and that of said reference image read operation.

19. An image decoding apparatus for decoding compressed and coded data as claimed in claim 15, wherein said memory control circuit arbitrates and schedules the memory access operations to determine the respective priorities thereof as follows, immediately after each of said reset operation, said reference image read operation and said decoded image write operation:
the priority of said coded image read operation>the priority of said display image read operation>the priority of said reference image read operation>the priority of said coded image write operation>the priority of said refresh operation>the priority of said decoded image write operation.

20. An image decoding apparatus for decoding compressed and coded data as claimed in claim 15, wherein said memory control circuit arbitrates and schedules the memory access operations to determine the respective priorities thereof as follows, immediately after said coded image write operation:
the priority of said coded image read operation>the priority of said display image read operation>the priority of said refresh operation>the priority of said decoded image write operation>the priority of said reference image read operation>the priority of said coded image write operation.

21. An image decoding apparatus for decoding compressed and coded data as claimed in claim 15, wherein said memory control circuit arbitrates and schedules the memory access operations to determine the respective priorities thereof as follows, immediately after said refresh operation:
the priority of said coded image read operation>the priority of said display image read operation>the priority of said decoded image write operation>the priority of said reference image read operation>the priority of said coded image write operation>the priority of said refresh operation.

22. An image decoding apparatus for decoding a compressed and coded data as claimed in claim 12, wherein the respective priorities of current memory access operations are determined in accordance with a preceding memory access operation.

23. An image decoding apparatus for decoding a compressed and coded data as claimed in claim 12, wherein said image decoding apparatus further comprises a display circuit for reading the decoded image data out of said memory and outputting a display data.

24. A semiconductor integrated circuit comprising:
an image decoding circuit decoding n coded data of a compressed image into decoded image data of expanded coded data and providing said decoded image data as an output; and
a memory control circuit controlling a memory that stores said coded data and said decoded image data in a time sharing manner, for selectively changing respective priorities of memory access operations of writing and reading said coded data and said decoded image data to and from said memory depending on a situation of said memory, and arbitrating and scheduling the memory access operations according to said respective, changed priorities, thereby avoiding concentration on or rejection of a specific memory access operation and eliminating an ineffective period.

25. A semiconductor integrated circuit as claimed in claim 24, wherein said memory is a dynamic random access memory.

26. A semiconductor integrated circuit as claimed in claim 25, wherein said memory control circuit arbitrates and schedules the memory access operations of writing and reading the coded data and the decoded image data to and from said dynamic random access memory and a memory access operation of refreshing said dynamic random access memory.

27. A semiconductor integrated circuit as claimed in claim 25, wherein the memory access operations of said dynamic random access memory, arbitrated and scheduled by said memory control circuit, comprise a coded image write operation for writing the coded data in said dynamic random access memory, a coded image read operation for reading the coded data out of said dynamic random access memory, a decoded image write operation for decoding the coded data and writing the decoded image data in said dynamic random access memory, a reference image read operation for referring to an image data of a preceding field or frame as a reference image when decoding the coded data, a display image read operation for reading the decoded image data out of said dynamic random access memory and displaying the decoded image data, and a refresh operation for refreshing said dynamic random access memory.

28. A semiconductor integrated circuit as claimed in claim 27, wherein said memory control circuit arbitrates and schedules the memory access operations to carry out non-urgent memory access operations, comprising at least said coded image write operation and said refresh operation, during a period between said decoded image write operation and said reference image read operation.

29. A semiconductor integrated circuit as claimed in claim 27, wherein said memory control circuit arbitrates and schedules the memory access operations to set said coded image read operation to a highest priority in order to realize a high speed reading operation.

30. A semiconductor integrated circuit as claimed in claim 27, wherein said memory control circuit arbitrates and schedules the memory access operations to set said coded image read operation to a higher priority than that of said decoded image write operation and that of said reference image read operation.

31. A semiconductor integrated circuit as claimed in claim 27, wherein said memory control circuit arbitrates and schedules the memory access operations to determine the respective priorities thereof as follows, immediately after each of said reset operation, said reference image read operation and said decoded image write operation:

the priority of said coded image read operation>the priority of said display image read operation>the priority of said reference image read operation>the priority of said coded image write operation>the priority of said refresh operation>the priority of said decoded image write operation.

32. A semiconductor integrated circuit as claimed in claim 27, wherein said memory control circuit arbitrates and schedules the memory access operations to determine the respective priorities thereof as follows, immediately after said coded image write operation:

the priority of said coded image read operation>the priority of said display image read operation>said refresh operation>the priority of said decoded image write operation>the priority of said reference image read operation>the priority of said coded image write operation.

33. A semiconductor integrated circuit as claimed in claim 27, wherein said memory control circuit arbitrates and schedules the memory access operations to determine the respective priorities thereof as follows, immediately after said refresh operation:

the priority of said coded image read operation>the priority of said display image read operation>the priority of said decoded image write operation>the priority of said reference image read operation>the priority of said coded image write operation>the priority of said refresh operation.

34. A semiconductor integrated circuit as claimed in claim 24, wherein the respective priorities of current memory access operations are determined in accordance with a preceding memory access operation.

35. A semiconductor integrated circuit as claimed in claim 24, wherein said semiconductor integrated circuit further comprises a display circuit for reading the decoded image data from said memory and outputting display data.

* * * * *

UNITED STATES PATENT AND TRADEMARK OFFICE
CERTIFICATE OF CORRECTION

PATENT NO. : 5,752,266
DATED : May 12, 1998
INVENTOR(S) : MIYAWAKI et al.

It is certified that error appears in the above-identified patent and that said Letters Patent is hereby corrected as shown below:

Col. 1, line 22, change "has" to --have--.

Col. 9, line 3, change "an" to --a--;
line 60, after "detection" insert --of--.

Col. 10, line 12, change "LsI" to --LSI--.

Col. 13, line 11, after "just" insert --(i.e., immediately)--.

Col. 14, line 42, before "said" insert --after--.

Signed and Sealed this

Fifteenth Day of September, 1998

Attest:

BRUCE LEHMAN

Attesting Officer

Commissioner of Patents and Trademarks